2 Sheets—Sheet 1.
W. Randolph,
Fish Net.
Nº 39,676.  Patented Aug. 25, 1863.
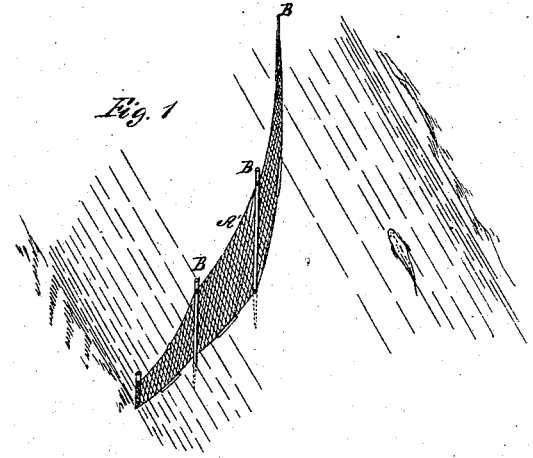
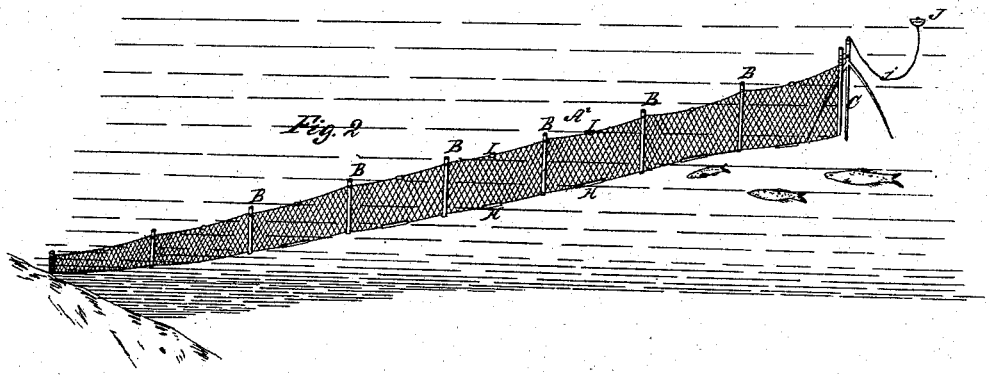
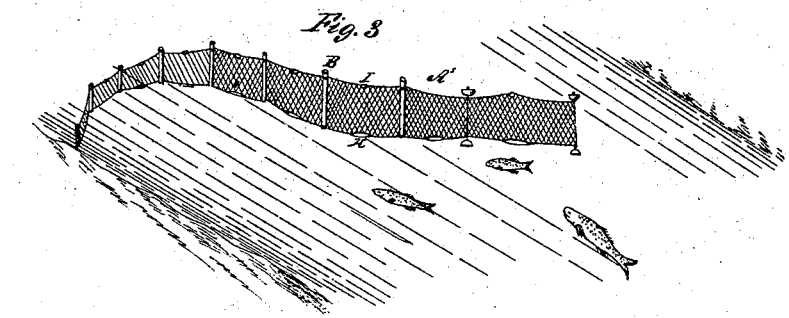
Witnesses:
Charles Smith
J. Schutter
Inventor:
William Randolph

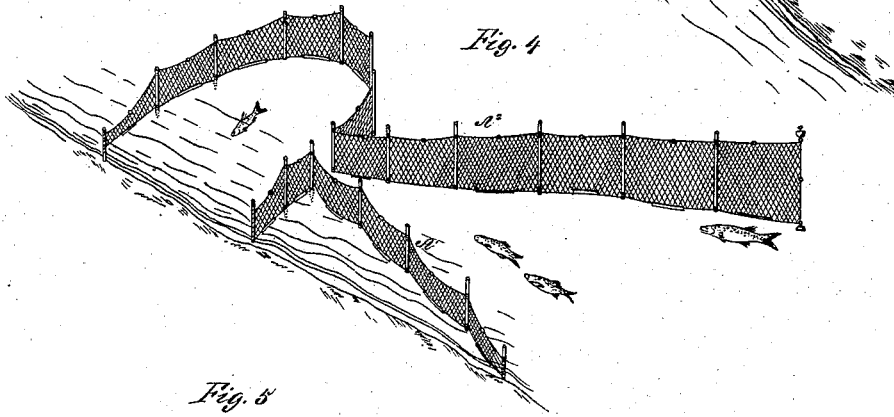
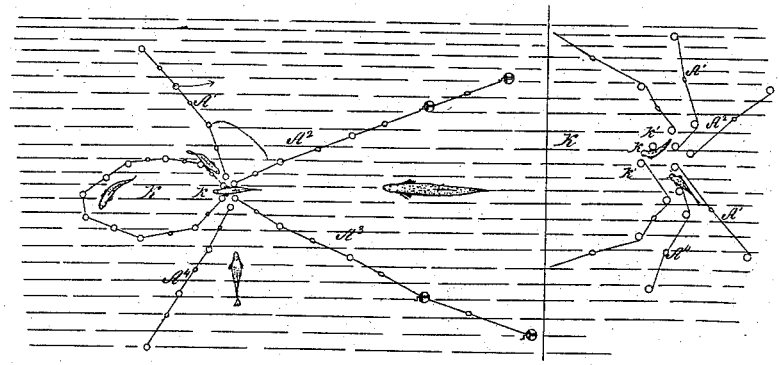
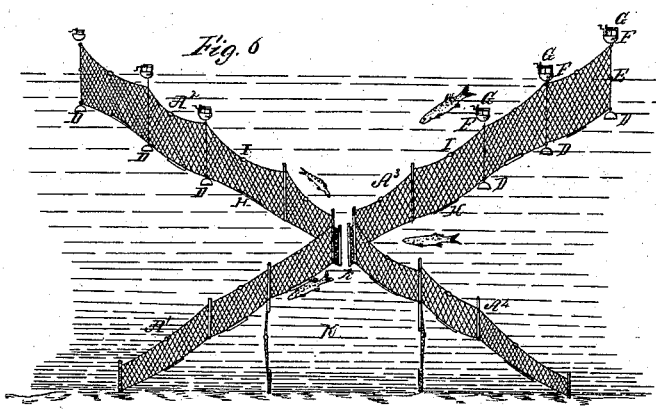

United States Patent Office.

WILLIAM RANDOLPH, OF BLOOMINGTON, ILLINOIS.

IMPROVEMENT IN THE ADJUSTMENT OF FISHING-NETS.

Specification forming part of Letters Patent No. 39,676, dated August 25, 1863.

*To all whom it may concern:*

Be it known that I, WILLIAM RANDOLPH, of Bloomington, in the county of McLean and State of Illinois, have invented certain new and Improved Devices for Capturing Fish; and I do hereby declare the following to be a full and exact description of the same, reference being had to the accompanying drawings, making part of this specification, in which—

Figures 1, 2, 3, 4, and 6 are perspective views, and Figs. 5 and 7 plans or top views, of various arrangements of nets illustrating my invention.

Similar letters of reference occuring in different views illustrate corresponding parts.

My said invention relates to certain devices for securing and sustaining guide-nets employed to conduct fish into contracted or limited spaces, where they may be entrapped or taken from the water, as hereinafter explained.

In order that others skilled in the art to which my invention appertains may be enabled to fully understand and use the same, I will proceed to describe its construction and operation.

$A'$ $A^2$ $A^3$ $A^4$ represent guide-nets, which may be arranged in various forms and combinations.

B B B represent stakes, which may be driven into the bottom, where the nature of the ground permits, to retain the nets in proper position. In rocky ground, where stakes cannot be driven, heavy three-footed standards C, of iron, will be substituted therefor. For deep water the stakes and standards may both be dispensed with, and instead thereof I employ heavy anchors D, attached to the lower ends of cords or chains E, and buoys F, attached to the upper ends of the same, so as to hold the said cords or chains in vertical positions. The nets are provided with rings which slide on the chains E.

G G represent winches mounted on the buoys F, and employed to draw the net tight in a vertical direction.

H H represent the customary sinking-leads, and I I suspension-corks.

J represents a buoy attached by a cord, $j$, to the upper end of the standard C, to indicate the position of the latter and enable it to be readily drawn up in the event of its being submerged or overturned.

I will now proceed to describe some of the many ways in which the nets may be used.

In Fig. 1 a single net, $A'$, is represented as applied to an inlet or river, where, from the ebbing and flowing of the tide, or from other causes, fish are accustomed to pass alternately up and down. While the fish are passing up the net is placed in the position indicated, its outer or farther end being turned up stream at a sufficient distance from shore to permit the fish to pass freely, and the whole net being fixed at such angle as will best serve to guide or conduct the ascending fish to this passage-way. As soon as the tide turns or the fish cease to ascend the outer end of the net is extended completely across the channel, or, if necessary, to the opposite shore, whereby the fish are prevented from descending, and as they congregate above the net they may be readily taken out by means of dip-nets, small seines, or other suitable appliances.

In Fig. 2 is represented another arrangement of stationary net, but in this case designed for use near the shore of the sea, lakes, or large rivers, where it is not practicable to obstruct the entire channel in the manner first described. In this case the net is extended as far as needful or convenient out into deep water, and fixed in position to gently and easily guide the fish toward the shore and into a contracted space, where they may be more readily captured.

In Fig. 3, $A^3$ represents an analogous arrangement of stationary net especially designed for places where the irregularity of the bottom renders it difficult to draw the net into the straight form shown in Fig. 2. The shore end of the net is also curved in such a form as to afford more convenient play for the small seine by which the fish may be removed.

In Fig. 4 the net $A^2$ is arranged in another form, its outer end constituting a guide and its inner end a partially inclosed basin, into which the fish will freely enter, but from which they will not readily escape. In connection with this the net $A'$ may, if desired, be used as an auxiliary guide by fixing it in the position shown, so as to conduct the fish to a more contracted opening into the inclosure, and more effectually preclude the possibility of their escape. For ordinary uses, where the fish are permitted to enter the inclosure voluntarily in ascending the stream, in accordance with their natural habits and inclination, they will remain therein a sufficient length of time to be captured, at intervals of two hours or more, with the small seine, and thus the auxiliary guide may be dispensed with; but when it is desired to drive the fish toward and into the inclosure the auxiliary guide is used, so as more effectually to prevent their escape while under excitement or alarm.

Fig. 5 represents an arrangement of the nets designed for use in deep water at a distance from shore. It consists, essentially, of a crib, K, which may be formed of wire, with a contracted opening at $k$.

The nets $A^2$ and $A^3$ may be used as conductors by fixing them in positions to converge toward or to the opening $k$, and the nets $A'$ and $A^4$ may be applied as wings or lateral guides to conduct the fish from other directions to the opening into the crib. The form of this aperture and the position of the adjacent parts of the guides will be more clearly understood from Fig. 7, which is a diagram thereof on a larger scale.

It will be evident that from whatever direction a fish may approach the crib the guides will conduct it to and through the aperture.

$k'$ $k'$ are small wings projecting inward from the aperture of the crib to prevent the escape of fish therefrom.

Fig. 6 represents the last-described apparatus applied to the shore.

In many places great difficulty is experienced in capturing the fish with nets now commonly in use, owing to the irregularity or unevenness of the bottom of the sea, river, &c.

From the above description it will be seen that my invention entirely obviates this difficulty, as it is adapted to operate with equal efficiency wherever it may be desired to fish.

The wings $k'$ $k'$ of the crib-gate $k$ may be secured to one or more vertical rods projecting downward from the apex of the forked standard C.

Having thus described my invention, what I claim as new therein, and desire to secure by Letters Patent, is—

1. The standard C, constructed and applied as herein shown and described, for securing the net in position.

2. The combination of the anchors D, chains or cords E, buoys F, and winches G, arranged and operating substantially as set forth.

WILLIAM RANDOLPH.

Witnesses:
OCTAVIUS KNIGHT,
CHARLES SMITH.